United States Patent Office 3,484,273
Patented Dec. 16, 1969

3,484,273
METHOD FOR MAKING POROUS SHEET MATERIAL
Shigeru Kawase, Settsu, Tohru Kitazawa, Osaka, Hiroo Ohba, Nishinomiya, and Kojiro Sagi, Takarazuka, Japan, assignors to Kanegafuchi Boseki Kabushiki Kaisha, a corporation of Japan
No Drawing. Filed Jan. 4, 1967, Ser. No. 607,138
Claims priority, application Japan, Jan. 14, 1966, 41/2,187, 41/2,188
Int. Cl. C09d 3/72; B44d 1/18
U.S. Cl. 117—63          11 Claims

ABSTRACT OF THE DISCLOSURE

A method of making micro-porous sheet material by impregnating and/or coating a base with a solution of a film forming polymer (ususally wholly or partly polyurethane). Urea is added at a temperature above the gelling point of the solution which is gelled by cooling below the gelling temperature. The urea and solvent are then removed by washing with a suitable selective solvent, all as more completely set forth in the specification.

---

This invention relates to an improved process for making micro porous sheet materials high in the moisture-permeability and flexibility and having softness and toughness.

There are known the following processes for producing moisture-permeable uniform microporous films desired for synthetic leather surface layers by using polyurethane resins:

(A) Forming a layer of a polymer solution and then exposing the layer to a controlled moistened atmosphere for a certain period of time before the layer is immersed and coagulated in water;

(B) Adding to a polymer solution water or any other non-solvent for the polymer in such an amount as to convert the polymer solution to a colloid dispersion but not to cause gelling;

(C) Adding and mixing water or any other non-solvent for the polymer into a polymer solution so that the polymer may be separated as a gel, which is then used for coating.

In the above mentioned process A, there are disadvantages that a strictly controlled atmosphere is required and that a very long time is required for the coagulation of a coating film of any thickness. Further, in this method temperature as well as the relative humidity must be controlled and, it is difficult to industrially put this method into practice to obtain homogeneous, uniform microporous films.

In the above mentioned process B, a considerably good micro-porous sheet is obtained. However, in preparing the so-called colloid dispersion just before substantial gelling of said polymer solution, the resulting colloid dispersion will be so greatly influenced by the concentration and temperature of said polymer solution to be used, the amount of the non-solvent (such as, for example, water) to be added thereto and the method of the addition of non-solvent that it will be necesary to very carefully adjust and control the optimum conditions. Therefore, it is disadvantageous to practice said process in the industry.

In the above mentioned process C, the step of separating gelled substance is so complicated and the control and adjustment of the proper concentration and viscosity of the gelled substance are difficult.

In order to overcome these drawbacks in conventional methods we have made extensive experiments and researches, and have found that a tough and soft porous sheet material high in the moisture-permeability and flexibility can be industrially benefically and easily produced by dissolving a polymer consisting of or consisting mainly of polyurethane in a water-miscible organic solvent which can cause sol-gel reversible conversion of the solution depending upon temperature variation, adding urea to the resulting polymer solution, impregnating or coating a fibruos mat (such as a non-woven fabric or felt), fabric (woven or knit), or substrate such as synthetic resin film or other film or plate (such as glass plate, metal plate or plastic plate) with the above prepared polymer solution at a temperature above its gelling temperature, then cooling it to a temperature below the gelling temperature of said polymer solution so that the applied polymer solution may coagulate, then quickly removing the solvent and urea by washing and finally drying the product.

Compared with the known processes, the process of the present invention has the following advantages:

(1) The polymer solution can be easily and uniformly applied without any trouble. The applied solution can be easily coagulated by simple cooling and the resulting product can be safely, easily and continuously subjected to washing and drying.

(2) Simply by adjusting the conditions such as temperature, urethane concentration and urea concentration of the polymer solution to a desired state, a stabilized coagulated product can be easily formed, and there is seen no shrink or deformation in the washing step.

(3) After the coagulation, the subsequent operations (washing and drying) are very simple and yet a tough, porous sheet material high in the gas-permeability and moisture-permeability can be produced.

(4) If the polymer solution is so adjusted that the gelling temperature will be the room temperature, no special cooling equipment will be required and the working step and operation will be simple.

(5) Further, as the process is characterized by first rendering the polymer solution in a stable coagulated state on a base fabric or substrate and then washing the same to regenerate said polymer, it is suitable to the production of homogeneous, thick, spongy sheets.

In carrying out the present invention, any of conventional film forming polyurethanes which are well known in the art may be used. Generally, for the production of such polyurethane, a prepolymer is prepared by reacting an organic diisocyanate with a polyalkylene ether glycol or a polyester having terminal hydroxyl radical. The prepolymer is then chain extended with a chain extender such as a diamine, diol or polyol to form polyurethane elastomer.

The organic diisocyanate may be an aromatic, aliphatic or alicyclic diisocyanate or a mixture of them such as, for example, toluylene-2,4-diisocyanate, toluylene-2,6-diisocyanate, diphenyl methane-4,4'-diisocyanate, 1,5-naphthylene diisocyanate, hexamethylene diisocyanate or paraxylene diisocyanate.

The polyalkylene ether glycol is, for example, polyethylene ether glycol, polypropylene ether glycol, polytetramethylene ether glycol or polyhexamethylene ether glycol or a copolymer or mixture of them. Further, for the polyol may be used glycerine or trimethylol propane.

The polyester which may be used is a polycondensation product of an organic acid and a glycol. Preferable glycol is such polyalkylene glycol as ethylene glycol, propylene glycol, tetramethylene glycol or hexamethylene glycol, such cyclic glycol as cyclohexane diol or such aromatic glycol as xylene glycol. Further, the acid to be used may be succinic acid, adipic acid, sebacic acid or terephthalic acid.

For the chain extender may be used such diamine as, for example, hydrazine, ethylene diamine, methylene diorthochloraniline, etc.

If desired a catalyst such as triethylamine, triethylene diamine, N-ethyl morpholine, dibutyl tin dilaureate or cobalt napthenate may be used in preparing the polyurethane elastomer.

For polyester having terminal hydroxyl radical, may be used such as is obtained by ring-opening-polymerizing a lactone in the presence of a small amount of a glycol or such as is obtained by polycondensing an excess diol with dicarboxylic acid and is of an average molecular weight of about 500 to 3000. For the lactone, it is preferable to employ δ-valerolactone, γ-butyrolactone or ε-caprolactone.

If desired a small amount of one or more of other polymers soluble in the solvent, such as polyvinyl chloride, polyvinyl alcohol, polyacrylonitrile and polyacrylic acid esters and their copolymers may be added to the above mentioned polyurethane solution.

The solvent for the polymer to be used in the present invention shall be selected from those miscible with water or a water-miscible liquid. Examples of these solvents are any single one or a mixture of any of N,N' dimethyl formamide (which shall be referred to as DMF hereinafter), N,N' dimethyl acetamide, dimethyl sulfoxide (which shall be referred to as DMSO hereinafter), dioxane, methyl ethyl ketone (which shall be referred to as MEK hereinafter), cyclohexanone, cyclohexanol, Cellosolve acetate, acid ethyl ester and tetrahydrofuran (which shall be referred to as THF hereinafter).

The base or substrate materials which are to be coated or impregnated with the polymer solution include felts, non-woven fabrics, woven fabrics, knit fabrics or natural fibers and/or synthetic fibers, films or sheets or plates of synthetic resin, glass, metal, etc.

The important feature of the present invention is to impregnate or coat said base material with the polymer solution added with urea at a temperature above the gelling temperature of the solution and then cool it to a temperature below the gelling temperature so that said polymer may be coagulated and regenerated.

The effect of urea added to the polymer solution is as follows. For example, when N,N'-dimethyl formamide or the like is used as the solvent, the linear urethane polymer will remain as a solution at a high temperature to a low temperature. However, when urea is added to the solution and is warmed to be a uniform transparent solution and is then gradually cooled, the entire system will coprecipitate as a gel below a certain temperature.

This will be further explained with reference to experiment example. First of all, the solubility of urea in DMF of about 18 g. in 100 g. of DMF at 30° C. will quickly increase to about 140 g. at 100° C. with the rise of the temperature. When a DMF solution in which a large amount of urea is present as dissolved at a high temperature is cooled to a lower temperature, the amount of urea exceeding the solubility at this lower temperature will be precipitated. In such case, if a polyurethane is present as dissolved together with the urea in the above mentioned DMF solution, the polyurethane will take a certain kind of combination with the deposited urea and will coprecipitate as a gelly modified urethane. Substantially no polymer will be present in the separated liquid phase. Further, it has been actually proved also from infrared ray absorption spectra that such characteristic absorption bands as of 3300, 1733, 1605 and 1540 cm.$^{-1}$ exist in the infrared absorption spectrum of the polyurethane mentioned in Example 2, but in the infrared absorption spectrum of a gel of urea modified urethane, such absorption bands as 3400, 1668 and 1622 cm.$^{-1}$ caused by urea also appear together with the above mentioned absorption bands of the polyurethane, indicating that certain combination has occurred between the urethane polymer and urea, resulting in urea-modified urethane polymer which is different from the original urethane polymer and no longer soluble in N,N'-dimethyl formamide.

When urea is dissolved in a DMF solution of a polyurethane, the higher the polyurethane concentration and urea concentration, the higher the gelling starting temperature of said solution. For example, in case substantially the same amounts of urea as of a polyurethane present as dissolved in solutions of 30 and 15% polyurethane are added to the respective solutions, the gelling starting temperature will be 140° C. in the former but 40° C. in the latter. Further, in case 10 and 6 parts of urea are respectively added to 100 parts of a solution containing 20% polyurethane, the gelling starting temperature will be 20° C. in the former, while it is 50° C. in the latter.

For example, 1 kg. of a 20% DMF solution of polyurethane is heated to 70° C., and 100 to 130 g. of urea are added to the solution and are perfectly dissolved, and the solution is kept at 60° C. Then a fibrous mat is immersed in a bath of said solution at that temperature and thereafter the mat impregnated with the hot solution is taken out of the bath. When the polymer solution retained in the mat is cooled to 20 to 30° C., the solution will become gelly and will lose its fluidity. Then the solvent can be quickly removed by washing with water and hot water. In this case, the already formed gel structure will be so stable that no deformation and shrinkage will occur in the subsequent steps. Thus, the process is adapted to continuously obtain homogeneous flexible porous sheet material.

The relations of the gelling starting temperature with the polyurethane concentration and urea concentration in case other solvents than DMF are used alone or as mixed with DMF are shown in the following table. For example, in case 10.6 parts of urea are added to 100 parts of a 20% solution of polyurethane, the gelling starting temperature will be as follows:

| Solvent | Mixing ratio | Gelling starting temperature, ° C. |
| --- | --- | --- |
| (1) DMF | Alone | 24 |
| (2) N,N'-dimethyl acetamide | do | 60 |
| (3) DMF+cyclohexanone | 1:11 by weight | 75 |
| (4) DMF+dioxane | do | 72 |
| (5) DMF+MEK | do | 75 |
| (6) DMF+DMSO | do | 47 |
| (7) DMF+N,N'-dimethyl acetamide | do | 42 |
| (8) DMF+ethyl acetate | do | 100 |

Though the gelling, starting temperature is not critical in this invention, it is convenient to adjust the solution so that the gelling starting temperature will be close to the room temperature.

The proper concentration of the polymer in the polymer solution containing urea to be used in the present method is 10 to 50% by weight and is preferably 15 to 30% by weight. If the polymer concentration is below 10% by weight, the coagulating velocity will be so low as to be inadequate, while above 50% by weight, the viscosity of the solution will be so high that the uniform impregnation or coating will be difficult.

The temperature at which the application of the polymer solution is conducted may be 30 to 120° C., preferably 40 to 80° C. If the temperature of the polymer solution is lower than 30° C., the cooling temperature will have to be made a comparatively low temperature below about 10° C. and therefore it will not be desirable. Further, above 120° C., some fiber forming components of said base material will be thermally shrunk or damaged and therefore such high temperature will not be desirable.

The proper cooling temperature for coagulating or gelling said polymer solution is −20° C. to 80° C., preferably 0° C. to 50° C. If the cooling temperature is below −30° C., the coagulating velocity will be high but will require a special cooling equipment. Further, above 80° C., the coagulating velocity will be low.

The proper amount of urea to be added and mixed into the above mentioned polymer solution is 20 to 180%, preferably 50 to 80% based on the weight of said polymer. If the urea concentration is below 20% by weight, the coagulating velocity will be comparatively low, and porosity in the finally formed microporous sheet will reduce, resulting in poor moisture-permeability. If the urea concentration is above 180% by weight, the moisture-permeability will not reduce but a long time will be required in the water-washing and removal of the urea and therefore economically it will not be desirable.

The urea-modified polyurethane gel formed in this invention is considerably tough and dense. Therefore, a leathery sheet of an expected quality will be formed while retaining the original form without varying the gel structure at all in the washing step for dissolving and removing the solvent and urea contained in the gel.

The washing liquid to be used in the washing step is water or cheap inert liquid which is non-solvent to the polyurethane and miscible with the solvent used in forming the polymer solution and can dissolve urea. Examples of these washing liquids are methyl alcohol or acetone. For washing, water or the inert liquid at the room temperature is usually used and it is convenient to utilize a shower, open soaper or the like. The water or inert liquid will permeate into the gel and dilute the solvent and therefore the gelling temperature of the polymer solution in or on the base material will apparently quickly and greatly rise. Thus, even when the material is further washed with a hot liquid (hot water), the gel will no longer dissolve and it will be possible to rather quickly and effectively wash away the remaining solvent and urea.

In this case, since the urea dispersed as micro fine particles in the gel is removed, there are formed micropores evenly distributed throughout the resulting polymer film. The same effect is also obtained by the removal of the solvent from the gel.

The subsequent drying may be conducted in any known manner and no special or unusual precaution is required.

The woven fabric, knit fabric or fibrous mat on which is formed the thus obtained microporous film structure of polyurethane is useful as a base for synthetic leather. The microporous film of polyurethane formed on such a sheet or plate as glass or metal plate can be peeled off to form a film or sheet suitable as a surface layer of synthetic leather.

The invention shall be explained in more details with reference to the following examples in which the parts and percentages are by weight unless otherwise specified.

EXAMPLE 1

There was used a commercial polyurethane resin solution (a resin concentration of 35% and a viscosity of 82,000 centipoises) prepared by producing a prepolymer from diphenyl methane-4,4'-diisocyanate and butylene adipate of a molecular weight of about 2,000 and further chain-extending the prepolymer with ethylene glycol in a dimethyl formamide solution.

Five parts of urea and 75 parts of cyclohexanone were added to 100 parts of the above mentioned urethane solution so that the resin concentration became 20% (the ratio of DMF and cyclohexanone was 13:15). The mixture was heated to 40° C. Then a dried glass plate heated to 40° C. was knife-coated with said solution and was left to stand so that the temperature of the glass plate and the surface layer of the polymer solution was allowed to decrease. When the temperature reached the gelling temperature (29° C.) of the solution, the coating layer gelled. The glass plate with the surface gel layer was cooled to the room temperature and was then washed with water at the room temperature to etxract and remove DMF and urea out of the gel. The water permeated into the gel diluted the DMF. The gell will not redissolve even if the temperature of the wash water exceeds the gelling temperature. Therefore, the glass plate with the gel layer was then washed with hot water at 80° C. and dried. The resulting film was separated from the plate. The properties of the film are as shown in Table 1.

TABLE 1

| | Thickness, mm. | Specific gravity | Strength, kg./mm.² | Elongation, percent | Moisture permeability-mg./cm.²/hr. |
|---|---|---|---|---|---|
| Cow leather | 0.65 | 0.53 | 0.880 | 62 | 10.8 |
| Film of Example 1 | 0.35 | 0.57 | 0.871 | 597 | 14.8 |

Note.—The strength and elongation were measured by the method of JIS K-6550 and the moisture-permeability was measured by the method of JIS K-6549.

EXAMPLE 2

There was used a commercial polyurethane resin solution (resin concentration 30%, and viscosity 40,000 centipoises) prepared by producing a prepolymer from diphenyl methane-4,4'-diisocyanate and butylene adipate of a molecular weight of about 2,000 and further chain-extending the prepolymer in a dimethyl formamide solution.

When 4 parts of urea were added to 100 parts of the above mentioned polyurethane solution and the solution was heated to 100° C., there was obtained a homogeneous solution. A dried glass plate heated to 50° C. was knife-coated with said polymer solution. The coated glass plate was left to stand, so that the temperature of the glass plate and the surface layer of the polymer solution was allowed to decrease. When the temperature of the polymer solution layer reached 40° C., the coating layer gelled. The gel layer was cooled to the room temperature and was then washed with water at the room temperature to extract and remove DMF out of the gel. The water permeated into the gel and diluted the DMF. Therefore, even when the water temperature was then raised to be above the gelling temperature, the formed gel no longer dissolved. Therefore, the glass plate with the surface gel layer was then washed with hot water at 80° C. to completely extract the DMF and urea remaining in the gel. The formed film was separated from the glass plate. The film thus obtained contained micro-pores evenly distributed and was high in the moisture-permeability. The properties of the film are as indicated in Table 2.

TABLE 2

| | Thickness, mm. | Specific gravity | Strength, kg./mm.² | Elongation, percent | Moisture-permeability, mg./cm.²/hr. |
|---|---|---|---|---|---|
| Cow leather | 0.65 | 0.53 | 0.884 | 61.8 | 10.8 |
| Film of Example 2 | 0.51 | 0.63 | 0.930 | 551.0 | 13.1 |

EXAMPLE 3

The procedure of Example 1 was repeated except the producing process was according that the polyurethane and urea concentrations were varied. The properties of the resulting films are as indicated in Table 3.

TABLE 3

| Polyurethane concentration, percent | Amount of urea, parts | Gelling starting temperature, °C. | Thickness, mm. | Specific gravity | Strength, kg./mm.$^2$ | Elongation, percent | Moisture permeability, mg./cm.$^2$/hr. |
|---|---|---|---|---|---|---|---|
| 30 | 20 | 101 | 0.30 | 0.58 | 0.95 | 538 | 12.6 |
| 25 | 16.7 | 66 | 0.33 | 0.62 | 0.89 | 624 | 12.4 |
| 20 | 13.3 | 38 | 0.29 | 0.57 | 1.04 | 525 | 14.1 |
| 15 | 10 | 17 | 0.35 | 0.60 | 0.94 | 598 | 13.5 |

Note.—The amount of urea is in parts per 100 parts of the particular polyurethane solution.

EXAMPLE 4

The procedure of Example 1 was repeated except that the amount of urea was varied. The properties of the films obtained are as indicated in Table 4.

TABLE 4

| Polyurethane concentration, percent | Amount of urea, parts | Gelling starting temperature, °C. | Thickness, mm. | Specific gravity | Strength, kg./mm.$^2$ | Elongation, percent | Moisture permeability, mg./cm.$^2$/hr. |
|---|---|---|---|---|---|---|---|
| 25 | 6.7 | 28 | 0.28 | 0.72 | 1.01 | 515 | 12.5 |
| 25 | 13.4 | 50 | 0.31 | 0.60 | 0.91 | 523 | 12.1 |
| 25 | 20.1 | 80 | 0.29 | 0.73 | 0.95 | 589 | 13.8 |
| 25 | 26.8 | 106 | 0.34 | 0.57 | 0.99 | 530 | 13.9 |

EXAMPLE 5

Crimped polyethylene tetraphthalate staple fibers of 1.5 denier and a length of 38 mm. were opened in an opener and were carded by a carding machine to form a web of 20 g./m$^2$. On the other hand, another web of 40 g./m.$^2$ was prepared by the same process by another carding machine. Both webs were fed at right angles on a conveyer of a crosslapper. The overlapped webs were fed to a needle loom by a conveyer and were needled. The needles were provided at a density of 34 needles per inch on a needle plate and were driven at a frequency of 450 strokes per minute. The feeding velocity of the webs was 9.6 mm./stroke. The webs having passed through the loom were again mounted on the conveyor of the cross-lapper and a separate web was further overlapped on them and the webs were again fed to the needle loom. This operation was repeated six times to obtain a mat of 465 g./m.$^2$. and a thickness of 5 mm. This mat was further needled alternately on both sides 12 times in all, with a feeding velocity of 4 mm./stroke. By this needling, the entanglement between the fibers of the mat were strengthened and the mat was made strong and dense. When the needling was finished, the density of needles per square inch was about 2700. The resulting mat was of a weight of 440 g /m.$^2$, a thickness of about 3 mm. and a specific gravity of 0.15. Then the mat was pressed with a flat hot press heated to 120° C. so as to be a smooth uniform mat of a thickness of about 2.5 mm. and a specific gravity of 0.18.

A resin solution (concentration 35%, viscosity 40,000 centipoises) prepared by producing a prepolymer from diphenyl methane-4,4'-diisocyanate and butylene adipate of a molecular weight of 2,000 dissolving the prepolymer in dimethyl formamide, and chain-extending the same with ethylene diamine.

The above mentioned solution was diluted with DMF to an elastomer content of 25%. Then 11 parts of urea per 100 parts of the DMF solution were added to the solution. When the mixture was heated to 80° C., the urea perfectly dissolved and a homogeneous solution was obtained.

The above mentioned mat was immersed in this solution at 80° C. for substantial saturation therewith, and then pressed with pressure rolls to squeeze out the excessive solution so that the desired polyurethane elastomer content is obtained.

The mat having passed through the pressure rolls was conveyed to a cooling chamber by a screen conveyor. In the cooling chamber, cold wind was blown onto the mat so that the temperature of the impregnated mat was comparatively quickly reduced. Temperature control was such that the temperature of the impregnated mat as discharged from the outlet of the cooling chamber was 28° C. Meanwhile, the polyurethane elastomer in the mat gelled uniformly throughout the interior of the mat and no longer flowable at the outlet of the cooling chamber.

Then the mat was washed with water at the room temperature first in an open soaper in order to extract and removed urea and remaining DMF. The mat was then dried in a drum dryer at 120° C. The dried mat was of a thickness of 4.8 mm. and a specific gravity of 0.39. Then the mat was split to be 1 mm. thick with a splitter and was then finely uniformly napped with a napper. The properties of the resulting mat are as follows:

| | |
|---|---|
| Weight g./m.$^2$ | 382 |
| Thickness mm. | 0.98 |
| Specific gravity g./cm$^3$ | 0.390 |
| Strength kg./mm$^2$ | 1.21 |
| Elongation percent | 90 |
| Bending stiffness cm.-g. | 6.2 |
| Moisture permeability mg./cm.$^2$/hr. | 17.8 |

EXAMPLE 6

The procedure of Example 5 was repeated except that the amount of urea was varied.

| | | | |
|---|---|---|---|
| Resin content, percent | 25 | 25 | 25 |
| Amount of urea, parts | 6.7 | 13.4 | 20.1 |
| Gelling starting temperature, °C. | 28 | 50 | 80 |
| Weight, g./m.$^2$ | 375 | 381 | 373 |
| Thickness, mm. | 1.01 | 1.00 | 0.97 |
| Specific gravity, g./cm.$^3$ | 0.372 | 0.381 | 0.383 |
| Strength, kg./mm.$^2$ | 1.31 | 1.50 | 1.48 |
| Elongation, percent | 84 | 96 | 95 |
| Bending stiffness, cm.-g. | 7.1 | 6.8 | 6.8 |
| Moisture-permeability, mg./cm.$^3$/hr. | 17.3 | 17.9 | 18.5 |

What we claim is:

1. A method of making a microporous sheet material which comprises the steps of impregnating or coating a base material with a coating solution, said coating solution comprising a film forming polyurethane polymer, a water miscible solvent and urea, said coating solution being at a temperature higher than its gelling temperature; cooling to a temperature lower than the gelling temperature of said coating solution to gel said coating solution; washing the gel with a liquid to substantially completely wash out the urea and solvent, said liquid being miscible with said solvent, able to dissolve said urea, and further being a non-solvent for said polymer; then drying to form said microporous sheet material.

2. A method as claimed in claim 1 wherein the content of the polymer in the coating solution is 10–50% by weight.

3. A method as claimed in claim 2 wherein the content of the polymer in the coating solution is 15–30% by weight.

4. A method as claimed in claim 1 in which the amount of urea in the coating solution is 20–180% by weight based upon the weight of the polymer in the solution.

5. A method as claimed in claim 4 in which the content of urea in the coating solution is 50–80% by weight based upon the weight of the polymer in the solution.

6. A method as claimed in claim 1 in which the temperature at which the coating solution is applied to the base material is higher than the gelling temperature of the said solution and within the range of 30–120° C. and the temperature to which the applied solution is cooled is below the gelling temperature of the said solution and within the range of −20 to 80° C.

7. A method as claimed in claim 6 in which the coating solution is applied to the base material at a temperature of 40–80° C. and the applied solution is cooled to a temperature of 0–50° C.

8. A method as claimed in claim 1 wherein the solvent of the polymer solution is selected from the group consisting of N,N'-dimethyl formamide, N,N'-dimethyl acetamide, dimethyl sulfoxide, dioxane, methylethyl ketone, cyclohexanone, cyclohexanol, Cellosolve acetate, acid ethyl esters and tetrahydrofurane.

9. A method as claimed in claim 1 wherein the liquid for washing the gel is selected from the group consisting of water, methanol, ethanol, acetone and a mixture of them.

10. A method as claimed in claim 1 wherein the base material is coated with the coating solution; the base material is made of a metal, glass or solid synthetic resin support; further including the step of separating the formed microporous sheet material from the base material.

11. A method as claimed in claim 1 in which the base material is woven fabric, knit fabric or fibrous mat.

References Cited

UNITED STATES PATENTS

| | | | |
|---|---|---|---|
| 2,819,981 | 1/1958 | Schornstheimer | 117—63 X |
| 2,826,509 | 3/1958 | Sarbach | 117—63 X |
| 2,983,960 | 5/1961 | Jilge | 260—77.5 |
| 3,000,757 | 9/1961 | Johnston | 260—2.5 |
| 3,067,482 | 12/1962 | Hollowell | 117—63 X |
| 3,100,721 | 8/1963 | Holden | 117—161 X |
| 3,169,885 | 2/1965 | Solodner | 117—63 X |
| 3,190,766 | 6/1965 | Yuan | 117—135.5 X |
| 3,222,208 | 12/1965 | Bertoll | 117—135.5 X |
| 3,296,016 | 1/1967 | Murphy | 117—63 X |
| 3,322,568 | 5/1967 | Solodner | 117—161 X |
| 3,369,925 | 2/1968 | Matsushita | 117—161 X |
| 3,387,989 | 6/1968 | West | 171—161 X |

WILLIAM D. MARTIN, Primary Examiner

W. R. TRENOR, Assistant Examiner

U.S. Cl. X.R.

117—135.5; 260—2.5; 264—41